US010699651B2

(12) United States Patent
Todd et al.

(10) Patent No.: US 10,699,651 B2
(45) Date of Patent: Jun. 30, 2020

(54) VEHICLE MOUNTED VIRTUAL VISOR SYSTEM HAVING A MODULAR LIQUID CRYSTAL DISPLAY

(71) Applicant: Robert Bosch GmbH, Stuttgart (DE)

(72) Inventors: Ryan P. Todd, Plymouth, MI (US); Jason Zink, Milford, MI (US); Andy Woodrich, Northville, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/131,892

(22) Filed: Sep. 14, 2018

(65) Prior Publication Data

US 2019/0096340 A1  Mar. 28, 2019

Related U.S. Application Data

(60) Provisional application No. 62/561,921, filed on Sep. 22, 2017.

(51) Int. Cl.
| | |
|---|---|
| *G09G 3/36* | (2006.01) |
| *G06F 3/14* | (2006.01) |
| *G02F 1/13* | (2006.01) |
| *B60J 3/04* | (2006.01) |
| *G02F 1/133* | (2006.01) |

(52) U.S. Cl.
CPC ............... *G09G 3/36* (2013.01); *B60J 3/04* (2013.01); *G02F 1/1313* (2013.01); *G06F 3/1431* (2013.01); *G06F 3/1446* (2013.01); *G02F 1/13318* (2013.01); *G09G 2300/026* (2013.01); *G09G 2310/0297* (2013.01); *G09G 2360/04* (2013.01); *G09G 2360/144* (2013.01); *G09G 2380/10* (2013.01)

(58) Field of Classification Search
CPC combination set(s) only.
See application file for complete search history.

(56) References Cited

U.S. PATENT DOCUMENTS

| | | | |
|---|---|---|---|
| 2003/0169213 A1 | 9/2003 | Spero |
| 2006/0175859 A1 | 8/2006 | Isaac |
| 2013/0146234 A1 | 6/2013 | Kim et al. |
| 2014/0039730 A1 | 2/2014 | Loubiere |
| 2014/0320946 A1 | 10/2014 | Tomkins et al. |
| 2017/0080782 A1 | 3/2017 | Spencer |

FOREIGN PATENT DOCUMENTS

| | | |
|---|---|---|
| CN | 202264622 U | 6/2012 |
| CN | 105652503 A | 6/2016 |
| CN | 206938400 U | 1/2018 |

(Continued)

*Primary Examiner* — Robin J Mishler
(74) *Attorney, Agent, or Firm* — Maginot, Moore & Beck LLP

(57) ABSTRACT

A modular virtual visor system is for a vehicle disclosed. The modular virtual visor system includes camera for detecting an illumination level on a face of a driver; a plurality of LCD panel modules mounted within the vehicle, and a controller. Each LCD panel module has LCD pixels configured to, (i) in an opaque state, block light from passing through the LCD screen and, (ii) in a transparent state, allow light to pass through the LCD panel module. The controller is configured to selectively operate each of the LCD pixels of each LCD panel module in either the opaque state or the transparent state so as to block high intensity light sources from shining on the face of the driver.

13 Claims, 8 Drawing Sheets

(56) References Cited

FOREIGN PATENT DOCUMENTS

| | | |
|---|---:|---|
| CN | 108583237 A | 9/2018 |
| DE | 102008052761 A1 | 4/2010 |
| DE | 102014206202 A1 | 10/2015 |
| JP | 2002087060 A | 3/2002 |
| JP | 2002331835 A | 11/2002 |
| JP | 2018095158 A | 6/2018 |
| KR | 20170029057 A | 3/2017 |
| WO | 2016119763 A1 | 8/2016 |
| WO | 2017134629 A1 | 8/2017 |
| WO | 2017219728 A1 | 12/2017 |

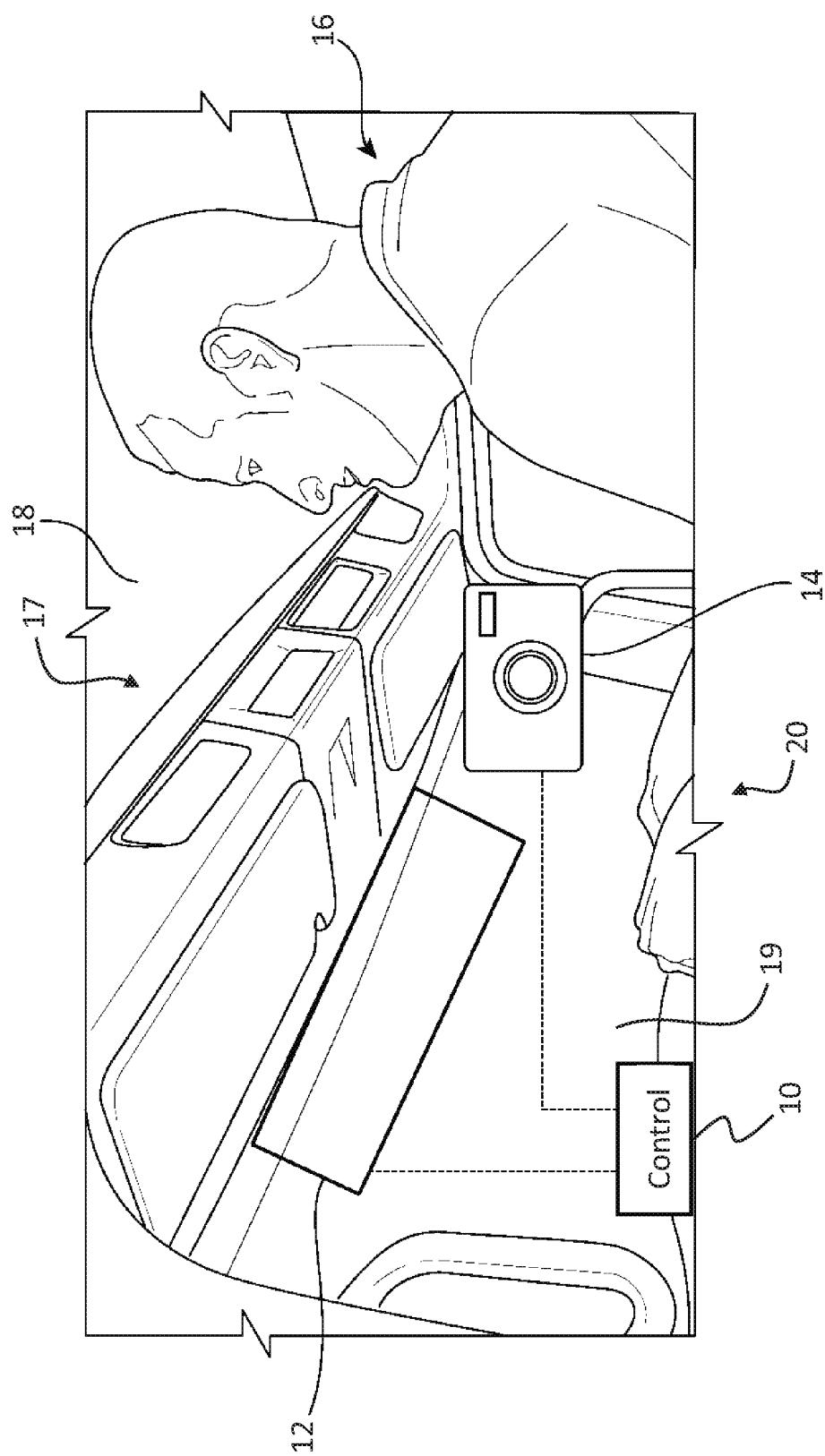

VEHICLE MOUNTED VIRTUAL VISOR SYSTEM HAVING A MODULAR LIQUID CRYSTAL DISPLAY

This application claims the benefit of priority of U.S. provisional application Ser. No. 62/561,921, filed on Sep. 22, 2017 the disclosure of which is herein incorporated by reference in its entirety.

FIELD

The device and method disclosed in this document relates to anti-glare systems and, more particularly, to vehicle mounted virtual visor system having a modular liquid crystal display.

BACKGROUND

Unless otherwise indicated herein, the materials described in this section are not prior art to the claims in this application and are not admitted to the prior art by inclusion in this section.

When driving an automotive vehicle in the mornings and evenings, a common problem is that the sun shines through the windshield and disrupts the view of the driver, making it challenging to clearly see the road and other vehicles. A conventional solution to this problem is to include manually deployable visors mounted adjacent to the windshield of the vehicle. The visor can be flipped, rotated, or otherwise repositioned to cover a portion of the windshield in an effort to block the sun. However, in the deployed position, the visor often fails to actually prevent the sun from disrupting the view of the driver. Additionally, even when the deployed visor does block the sun, the visor itself is disruptive the view of the driver, often blocking the view of high mounted road signs and stop lights. In order to overcome these issues, the driver often must reposition his or her head so that the visor blocks the sun, while not overly disrupting the rest of his or her view. What is needed is a visor system which reliably blocks high intensity light sources, such as the sun, while minimizing the disruption to the rest of the view of driver through the windshield.

SUMMARY

A modular a visor system for a vehicle is disclosed. The modular visor system comprises a plurality of liquid crystal display (LCD) panel modules mounted within the vehicle. Each LCD panel module comprises a first plurality of LCD pixels arranged in a grid formation, each LCD pixel configured to, (i) in an opaque state, block light from passing through a corresponding area of the respective LCD panel module and, (ii) in a transparent state, allow light to pass through the corresponding area of the respective LCD panel module; a bezel configured to surround and secure the first plurality of LCD pixels in the grid formation; and a first plurality of connections operably connected to first plurality of LCD pixels, the first plurality of LCD pixels being configured to be selectively operated in the opaque state and the transparent state depending on control signals received via the first plurality of connections from a common controller.

A modular visor system for a vehicle is disclosed. The modular visor system comprises a sensor configured to detect an illumination level of at least one location within the vehicle; a plurality of liquid crystal display (LCD) panel modules mounted within the vehicle, each LCD panel module having a plurality of LCD pixels arranged in a grid formation, each LCD pixel configured to, (i) in an opaque state, block light from passing through a corresponding area of the respective LCD panel module and, (ii) in a transparent state, allow light to pass through the corresponding area of the respective LCD panel module; and a controller operably connected to the sensor and the plurality of LCD panel modules, the controller configured to (i) receive a sensor signal from the sensor, (ii) determine the illumination level of the at least one location based on the sensor signal, and (iii) selectively operate each pixel of the plurality of LCD pixels of each of the plurality of LCD panel modules in the opaque state and the transparent state depending on the illumination level of the at least one location within the vehicle.

A modular a visor system for a site is disclosed. The modular visor system comprises a plurality of shutter panel modules mounted at a site. Each shutter panel module comprises a plurality of shutter pixels arranged in a grid formation, each shutter pixel configured to, (i) in an opaque state, block light from passing through a corresponding area of the respective shutter panel module and, (ii) in a transparent state, allow light to pass through the corresponding area of the respective shutter panel module; and a plurality of connections operably connected to plurality of shutter pixels, the plurality of shutter pixels being configured to be selectively operated in the opaque state and the transparent state depending on control signals received via the plurality of connections from a common controller.

BRIEF DESCRIPTION OF THE DRAWINGS

The foregoing aspects and other features of the visor system are explained in the following description, taken in connection with the accompanying drawings.

FIG. 1 is a side view, with certain portions removed or cut away, of a portion of a driver compartment of a vehicle showing an exemplary embodiment of a vehicle mounted virtual visor system;

DETAILED DESCRIPTION

Figure 2A:
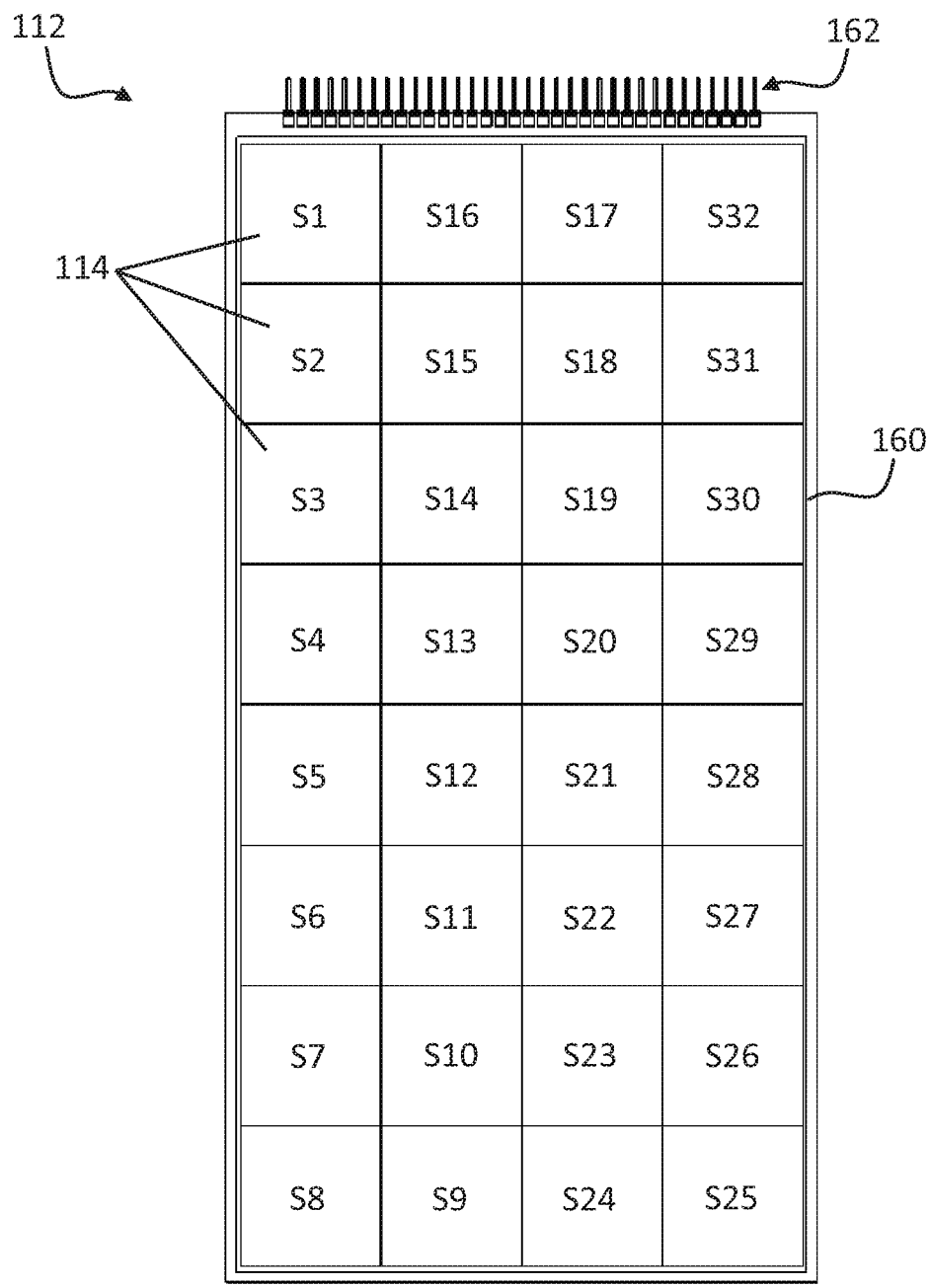
FIGS. 2A and 2B are simplified block diagrams showing exemplary LCD panel modules which may form at least part of the LCD screen of the virtual visor system.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

With reference to FIG. 1, an exemplary embodiment of a vehicle mounted virtual visor system 20 is described. Particularly, FIG. 1 shows a partial view of a cabin 17 and windshield 19 of a vehicle 18 in which the virtual visor system 20 is installed. The vehicle 18 may be a passenger vehicle, a commercial vehicle, an off-highway vehicle, a recreational vehicle, or any other suitable vehicle. The virtual visor system 20 at least includes a liquid crystal display (LCD) screen 12, which is mounted, attached or otherwise integrated with the vehicle 18 so as to cover and/or obstruct a portion of the windshield 19 or other window of the vehicle 18. The virtual visor system 20 is configured to detect changes in an illumination level within the cabin 17 of the vehicle 18. The virtual visor system 20 is configured to automatically adjust an optical property of one or more pixels of the LCD screen 12 so as to prevent high intensity light sources from disrupting the view of a driver 16 or other passenger residing in the cabin 17. In this way, the virtual visor system 20 improves the safety of the vehicle by minimizing disruption of the view of the driver. It will be appreciated however, that the virtual visor system may also be used in settings other than a vehicle, such as a room of a building (e.g., an office environment).

In at least some embodiments, the LCD screen 12 is mounted or otherwise attached to a surface within the cabin 17 of the vehicle 18, in the field of view of the driver 16 or other passenger. Particularly, in some embodiments, the LCD screen 12 is mounted to the vehicle 18 so as to be in the line of sight of the driver 16 sitting in the driver's seat and looking through the windshield 19. For example, in the case of a left-hand drive vehicle, the LCD screen 12 may be mounted to the roof adjacent to the windshield 19 so as to cover and/or obstruct at least a portion of an upper-left (as viewed from within the cabin 17) region of the windshield 19. Conversely, in the case of a right-hand drive vehicle, the LCD screen 12 may be mounted to the roof adjacent to the windshield 19 so as to cover and/or obstruct at least a portion of an upper-right (as viewed from within the cabin 17) region of the windshield 19. The LCD screen 12 may be proportioned, mounted and arranged to cover and/or obstruct any region or regions of the windshield 19, as well as regions of other windows of the vehicle 18. As further examples, the LCD screen 12 may be mounted to any of the pillars of the vehicle 18 adjacent to the windshield 19 or other window, mounted to the dash, or mounted directly to the windshield 19 other window itself in order to cover different regions of the windshield 19 or other windows of the vehicle 18. In some embodiments, the LCD screen 12 may by hingedly or pivotally mounted to an interior surface of the vehicle 18 such that its orientation can be manually adjusted. Alternatively, in some embodiments, the LCD screen 12 is integrated within the glass of windshield 19 or other window of the vehicle.

The virtual visor system 20 further includes an illumination sensor, such as a camera 14. The camera 14 or other illumination sensor is configured to detect an illumination level of at least one location of interest within the cabin 17 of the vehicle 18. Particularly, in at least one embodiment, the camera 14 is mounted in the vehicle 18 at a location which has a clear view of the face of the driver 16 so as to detect an illumination level on the face of the driver 16. In one embodiment, the camera 14 is mounted to or otherwise integrated with the left or right "A" pillar of the vehicle 18. In another embodiment, the camera 14 is mounted to or otherwise integrated with the dash or steering wheel. In a further embodiment, the camera 14 is mounted to the interior side of the roof of the vehicle 18, adjacent to the top of the windshield 19. The camera 14 is configured to continuously or periodically capture images of the face of the driver 16 and output the captured image frames.

The virtual visor system 20 further includes a controller 10, which is operably connected to the LCD screen 12 and to the camera 14 or other illumination sensor. The controller 10 generally comprises at least one processor and at least one associated memory having program instructions stored thereon, which are executed by the at least one processor to achieve the described functionalities. It will be recognized by those of ordinary skill in the art that a "controller" or "processor" includes any hardware system, hardware mechanism or hardware component that processes data, signals, or other information. The controller 10 may include a system with a central processing unit, multiple processing units, or dedicated circuitry for achieving specific functionality.

The LCD screen 12 has a plurality of independently operable LCD pixels and/or LCD shutters arranged in a grid formation. Each pixel is configured to be selectively operated by the controller 10 in one of at least two optical states: (1) an opaque state, in which the respective pixel blocks light from passing through a respective area of the LCD screen 12 and (2) a transparent state, in which the respective pixel allows light to pass through the respective area of the LCD screen 12. It will be appreciated, however, that any number of intermediate optical states may also be possible. Furthermore, the opaque state and the transparent state do not necessarily indicate a 100% opaque characteristic and a 100% transparent characteristic, respectively. Instead, the opaque state is simply one which blocks more light from passing through the respective area than does the transparent state. It will be appreciated that the LCD screen 12 may instead utilize technology other the LCD pixels and a shutter screen may utilize any type of panel having shutter pixels that are electrically, magnetically, and/or mechanically controllable to adjust an optical transparency thereof.

The controller 10 is configured to receive a sensor signal from the illumination sensor. More particularly, in at least one embodiment, the controller 10 is configured to receive image frames from the camera 14. Based on the sensor signal and/or the image frames, the controller 10 is configured to determine the illumination level of at least one location with within the cabin 17 of the vehicle, particularly, the illumination level on the face of the driver 16. Depending on the determined illumination level, the controller 10 is configured to selectively operate each pixel of the LCD screen 12 in either the opaque state or the transparent state (or a selected intermediate optical state).

In at least one embodiment, the controller 10 is operably connected to one or more row/column driver circuits (not shown), via which the controller 10 controls the optical state of each individual pixel of the LCD screen 12. The row/column driver circuits may comprise any suitable arrangement of multiplexers, transistors, amplifiers, capacitors, etc. configured to control the optical state of each individual pixel of the LCD screen 12 in response to control signals provided by the controller 10. In some embodiments, portions of the row/column driver circuits may be integrated with the LCD screen 12 and the pixels thereof. In some embodiments, portions of the row/column driver circuits may be integrated with the controller 10.

FIG. 2 shows an LCD panel module 112 which, in one embodiment, forms at least part of the LCD screen 12. The LCD panel module 112 comprises an array of pixels 114 arranged in a grid formation. Particularly, in the embodiment shown, the LCD panel module 112 comprises thirty-two pixels 114 (S1-S32) arranged in four columns and eight rows (i.e., a 4×8 grid formation). However, it will be appreciated that the LCD panel module 112 may include any number of pixels arranged in any suitable number of rows and columns. Additionally, the pixels can be arranged in non-rectangular and/or irregular formations having pixels of various shapes and sizes. In at least one embodiment, the LCD panel module 112 includes a bezel 160 configured to surround and/or contain the array of pixels 114 (S1-S32) and to secure and/or hold array of pixels 114 (S1-S32) together. It will be appreciated that the LCD panel module 112 may instead utilize technology other the LCD pixels and a shutter panel module may utilize any type of panel having shutter pixels that are electrically, magnetically, and/or mechanically controllable to adjust an optical transparency thereof.

The LCD panel module 112 includes one or more interfaces comprised of links or connections 162 configured to connect the controller 10 and/or the row/column driver circuits to the individual pixels 114 (S1-S32). The controller 10 and/or the row/column driver circuits are configured to provide appropriated voltages, currents, data, and/or other signals to the LCD panel module 112 via the connections 162 to operate the pixels 114 (S1-S32) and control the optical states thereof (i.e., control whether each pixel is in the opaque state or the transparent state, discussed above). In some embodiments, certain data or other signals are transmitted back to the controller 10 from the pixels 114 (S1-S32) via the connections 162.

Figure 2B:
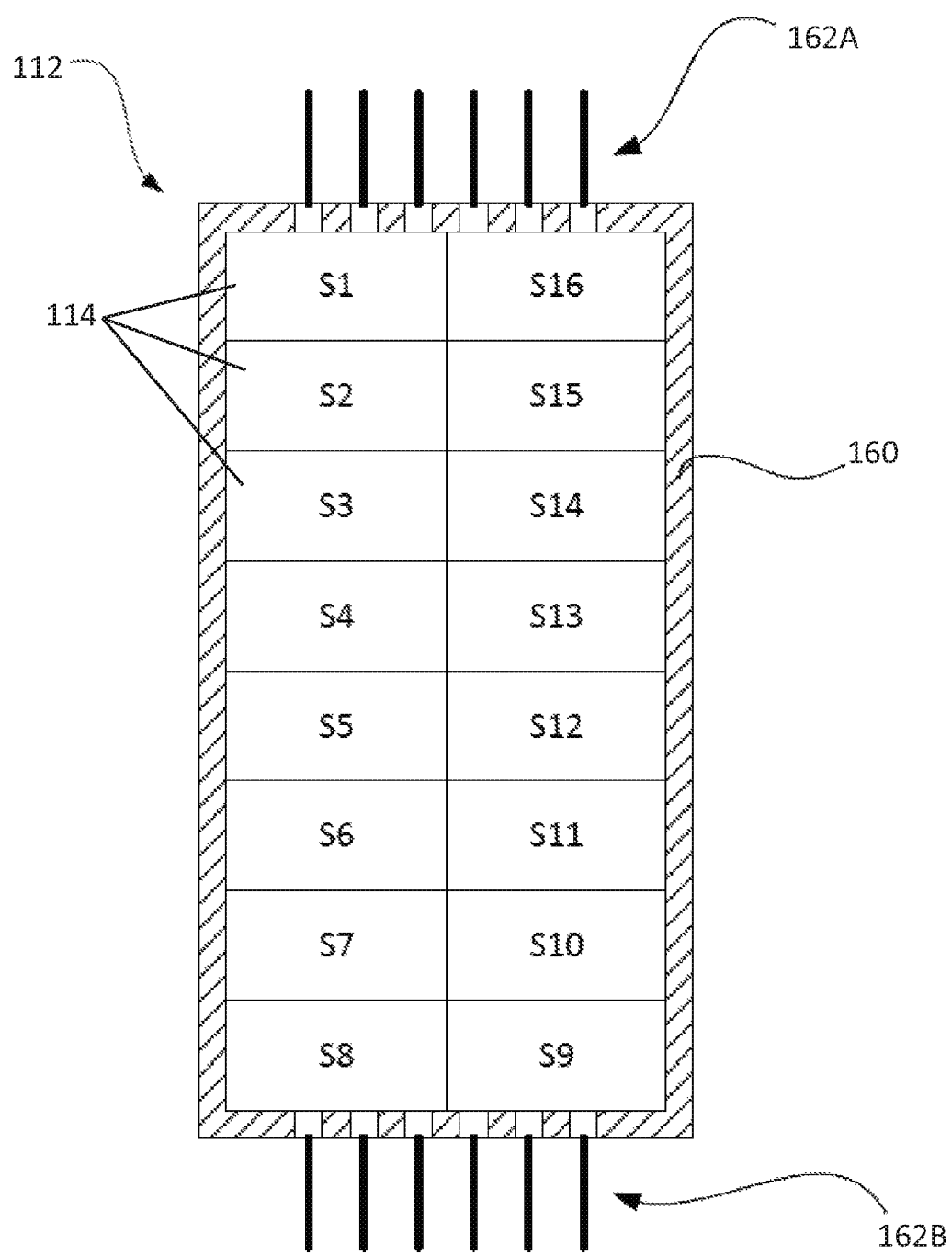

In the embodiment of FIG. 2A, the connections 162 are arranged at the top portion of the bezel 160, but such connections 162 may be arranged on the LCD panel module 112 in any manner. Particularly, FIG. 2B shows an alternative embodiment in which the LCD panel module 112 comprises sixteen pixels 114 (S1-S16) arranged in two columns and eight rows (i.e., a 2×8 grid formation). In this embodiment, of FIG. 2B, connections 162A are arranged at the top portion of the bezel 160 and connections 162B are arranged at the bottom portion of the bezel 160. The connections 162A may, for example, carry control signals for the half of the pixels 114 (e.g., S1-S8) and the connections 162B may, for example, carry control signals for the other half of the pixels 114 (e.g., S9-S16).

Figure 3:
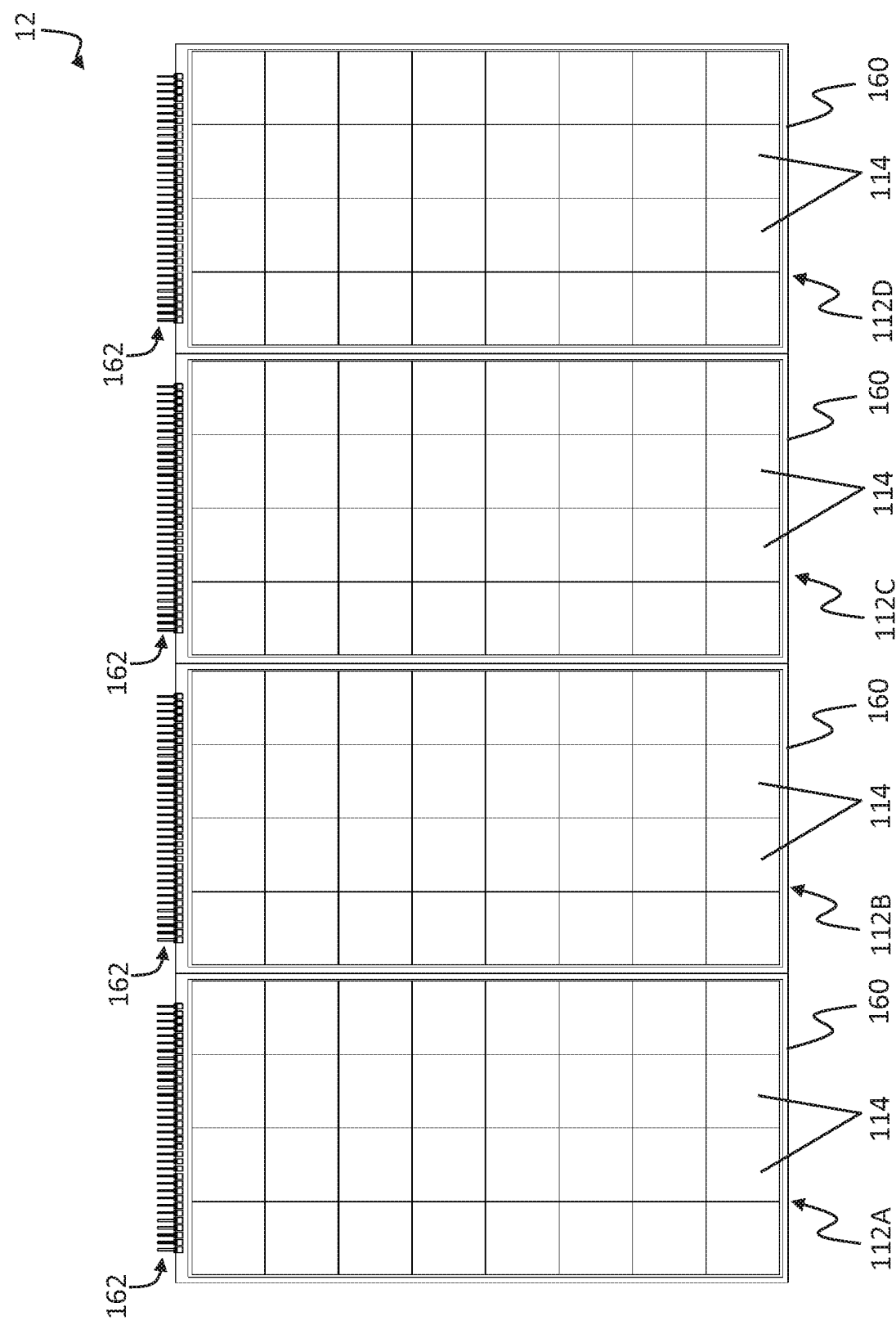
FIG. 3 shows one embodiment of the LCD screen which is formed by a row of four discrete LCD panel modules.

If desired, a wider or a larger LCD screen 12 may be formed in a modular manner using a plurality of discrete LCD panel modules 112, each having an array of pixels 114, a corresponding bezel 160 that contains the pixels, and corresponding connections 162. Particularly, FIG. 3 shows one embodiment of the LCD screen 12 which is formed by a row of four discrete LCD panel modules 112A-D, each having an array of pixels 114, a corresponding bezel 160 that contains the pixels, and corresponding connections 162. Each LCD panel module 112A-D is operably connected to the common controller 10 via the respective connections 162. In the illustrated embodiment, at least some of the discrete LCD panel modules 112A-D are physically connected to one another via the respective bezels 160 and/or physically abut one another. However, in some embodiments, the LCD screen 12 may be comprised by discrete LCD panel modules 112 which are spaced apart from one another within the vehicle 18 and attached to the vehicle at any arbitrary locations. In one embodiment, each LCD panel module 112 is individually driven with a predetermined voltage and/or voltage range, such as a voltage between 0 and 5 Volts.

Figure 4:
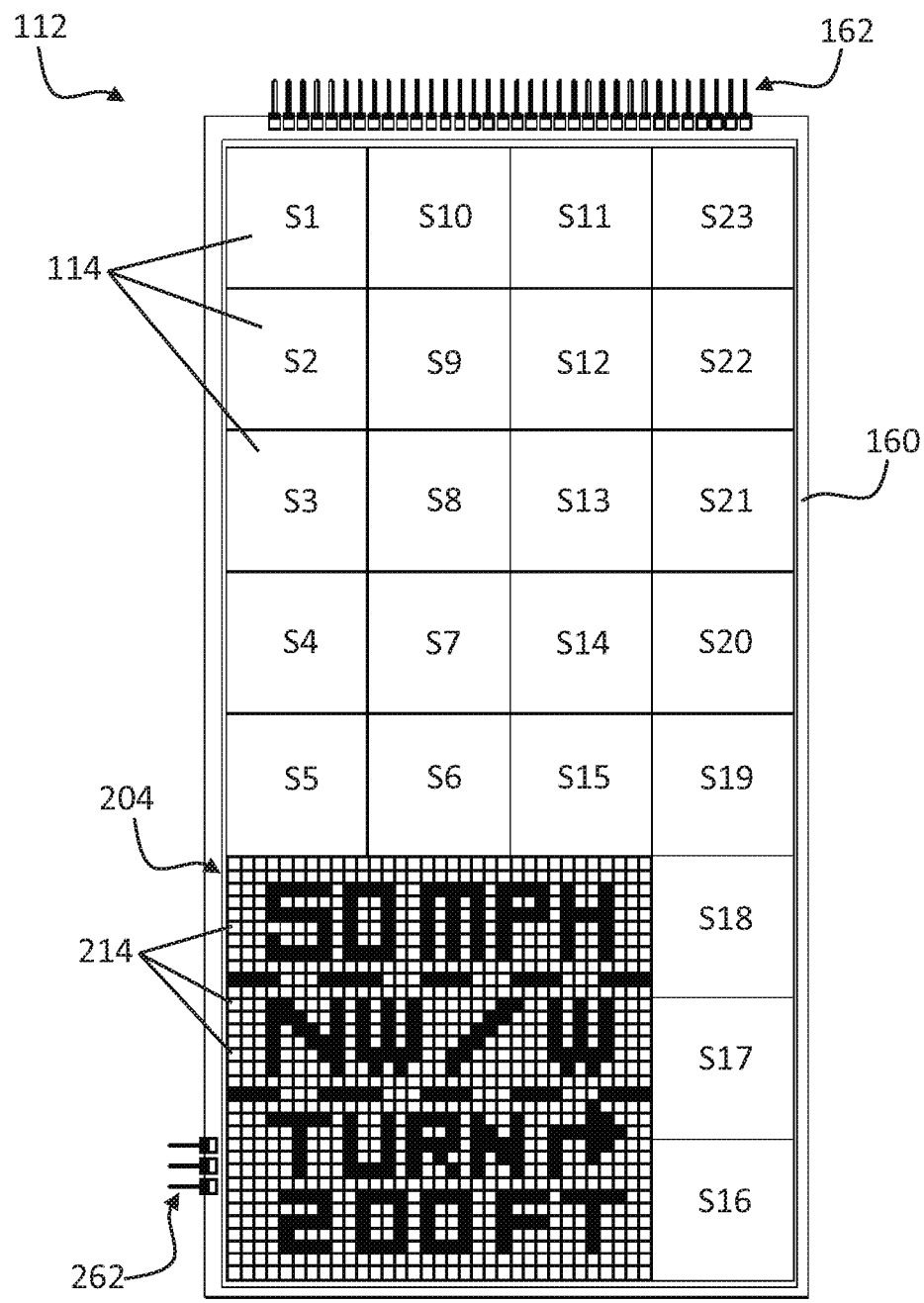
FIG. 4 shows one embodiment of an LCD panel module that has an information section.

FIG. 4 shows one embodiment of an LCD panel module 112 that has an information section 204. Particularly, in some embodiments, in addition to operating to prevent high intensity light sources from disrupting the view of a driver 16, one or more of the LCD panel modules 112 may be configured to display information via an information section 204. The information section 204 has a plurality of independently operable LCD pixels 214 arranged in a grid formation, which are essentially similar to the pixels 114 of the LCD panel modules 112 and are similarly contained by the bezel 160. Much like the pixels 114, in at least one embodiment, each pixel 214 is configured to be selectively operated by the controller 10 in one of at least two optical states: (1) an opaque state, in which the respective pixel blocks light from passing through a respective area of the LCD screen 12 and (2) a transparent state, in which the respective pixel allows light to pass through the respective area of the LCD screen 12. However, in some embodiments, the pixels 214 may operate differently and may have a variety of semi-transparent optical states and/or colored optical states. In at least one embodiment, the pixels 214 are smaller than the pixels 114 and the information section 204 has a greater pixel density than that of the rest of the LCD panel module 112.

The controller 10 is configured to operate the pixels 214 of the information section 204 to display information to the driver 16. In one embodiment, the illustrated LCD panel module 112 having the information section 204 may replace, for example, the leftmost LCD panel module 112A of the embodiment of FIG. 3. In the illustrated embodiment, the information section 204 displays a driving speed (e.g., "50 MPH"), a driving direction (e.g., "NW/W"), and navigation information (e.g., Turn Right, 200 ft). The LCD panel module 112 of the illustrated embodiment has additional connections 262 via which the controller 10 provides control signals to operate the pixels 214 of the information section 204 to display information to the driver 16. In one embodiment, the controller 10 is configured to receive the information via signals from an in-car navigation system, an in-car infotainment system, a trip computer, an speedometer, a compass, and/or any other appropriate device that senses or otherwise has access to information that is to be displayed in the information section 204.

Figure 5:
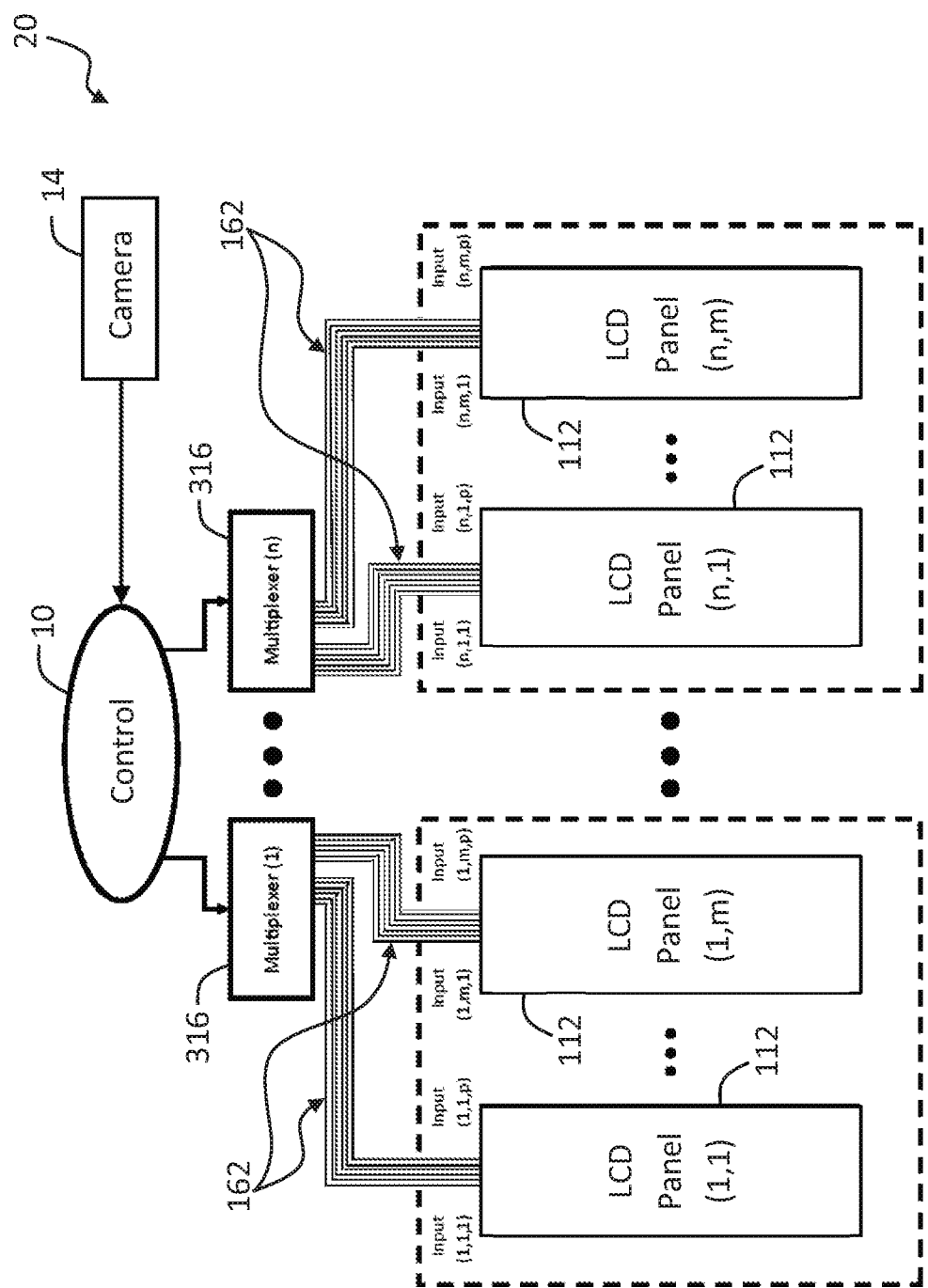
FIG. 5 illustrates one embodiment of the virtual visor system in which the LCD screen comprises and n×m array of discrete LCD panel modules.

FIG. 5 illustrates one embodiment of the visor system 20 in which the LCD screen 12 comprises and n×m array of individual LCD panel modules 112, each having p pixels. In the illustrated embodiment, the visor system 20 includes n multiplexers 316, which route control signals from the controller 10 to each of the individual LCD panel modules 112, via the connections 162. The multiplexers 316 can be considered part of the row/column driver circuits discussed above. Each of the multiplexers 316 is associated with a respective column 1, 2, . . . , n of the n×m array of LCD panel modules 112 and routes control signals from the controller 10 to the m LCD panel modules 112 in the respective column. For example, a $1^{st}$ multiplexer 316 is configured to route input signals to the $1^{st}$ column of m LCD panel modules 112. In particular, the $1^{st}$ multiplexer 316 routes inputs (1,1,1) through (1,1,p) to the LCD panel module 112 at the position (1,1) and likewise with respect to each other LCD panel module 112 in the $1^{st}$ column. With respect to the input signals (x,y,z) shown in FIG. 5, the first and second indices x and y identify the column and row position of the respective LCD panel module 112 and the third index z identifies with particular pixel of the respective LCD panel module 112. It will be appreciated that the described embodiment is merely exemplary and that a variety of different multiplexing schemes and/or row/column driving circuits can be used to route control signals from the controller 10 to the appropriate respective LCD panel module 112.

Returning to FIG. 1, as discussed above, above the camera 14 is configured to capture images of the cabin 17 or, more particularly, the face of the driver 16. The image frames captured by the camera 14 are provided to the controller 10. The controller 10 is configured to process the image frames to determine an illumination level of at least one location of interest within the cabin 17 of the vehicle 18. Particularly, in at least one embodiment, the controller 10 is configured to process the image frames to determine an illumination level on a face of the driver 16 or, more particularly, on the eyes of the driver 16.

Figure 6A:
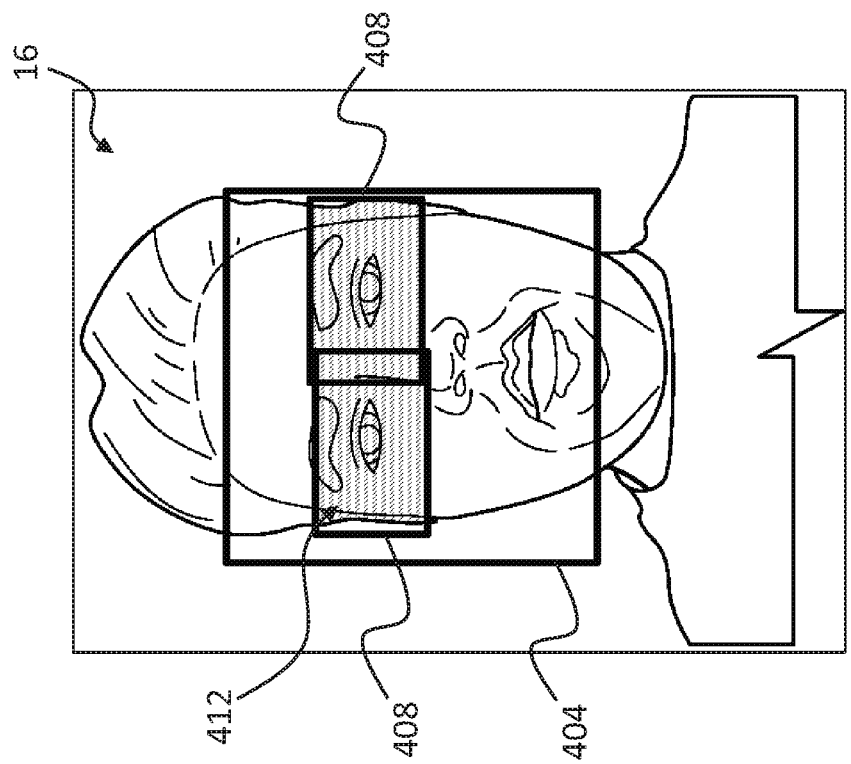
FIGS. 6A and 6B show exemplary front views of a driver taken by the camera.
Figure 6B:
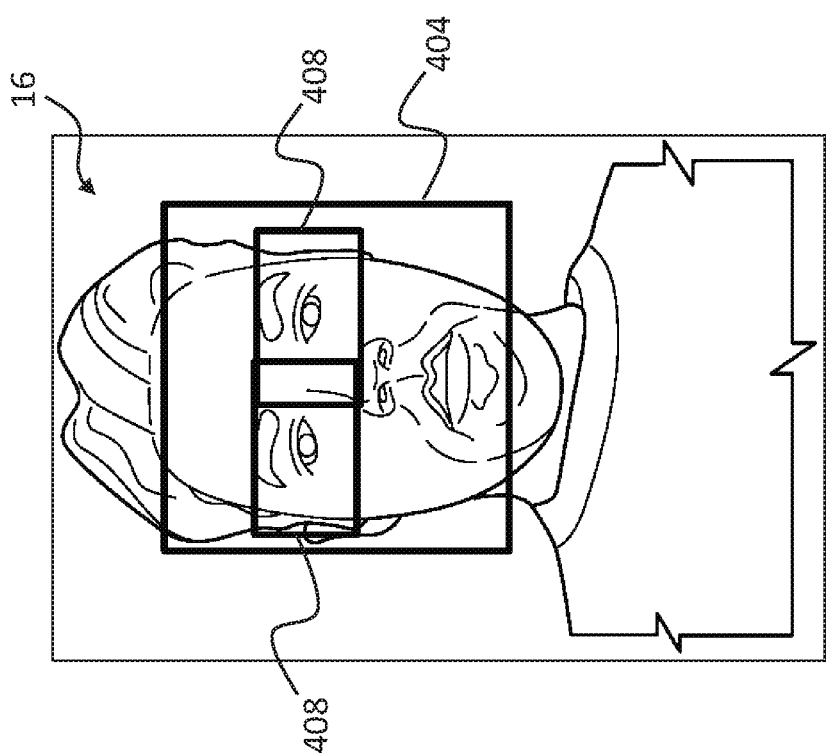

In some embodiments, the controller 10 is configured to process the image frames to determine which regions of the image frame correspond to the face of the driver 16 and which regions of the image frame correspond to the eyes of the driver, which depend on the particular location and pose of the face. FIGS. 6A and 6B show exemplary images captured by the camera 14 of the driver 16 of the vehicle 18. Regions 404 are identified by the controller 10 as corresponding to the face of the driver 16. Similarly, regions 408 are identified by the controller 10 as corresponding to the face of the driver 16. In further embodiments, the controller 10 is configured to determine a location of the face of the driver 16 within the cabin 17 and a pose/orientation of the face of the driver 16. The controller 10 is configured to determine an illumination level on the face and/or the eyes of the driver 16 based on the pixels of the image frame corresponding to the face and/or the eyes of the driver 16. In one embodiment, the illumination level is calculated as an average brightness value of the pixels of the image frame corresponding to the face and/or the eyes of the driver 16.

In some embodiments, the controller 10 is configured to determine a baseline illumination level of the at least one location of interest within the cabin 17. Particularly, in at least one embodiment, the controller 10 is configured to determine a baseline illumination level on the face of the driver 16 or, more particularly, determine a baseline illumination level on the eyes of the driver 16. The controller 10 is configured to determine a change in the illumination level by comparing the illumination level in each image frame with the determined baseline illumination level, in order to determine whether each pixel of the LCD screen 12 is to be operated in the opaque state or the transparent state. It will be appreciated that the baseline illumination level and the detected changes will vary depending on characteristics of the driver 16, such as skin color, eye color, facial hair, facial features, and so forth, as well as what the driver 16 is wearing, such as, sun glasses, eye glasses, hats, scarfs, or other light obstructing items. Additionally, it will be appreciated that the detected changes in the illumination level may be a result of a changing in the lighting environment or a change in optical state of one or more of the pixels of the LCD screen 12.

The controller 10 is configured to operate at least one pixel of the LCD screen 12 in the opaque state in response to the illumination level and/or the change in the illumination level of the at least one location of interest within the cabin 17 exceeding a predetermined threshold. In at least one embodiment, the controller 10 is configured to operate at least one pixel of the LCD screen 12 in the opaque state in response to the illumination level and/or the change in the illumination level on the face of the driver 16 exceeding the predetermined threshold or, more particularly, in response to the illumination level and/or the change in the illumination level on the eyes of the driver 16 exceeding the predetermined threshold.

The controller 10 is configured to select the at least one pixel of the LCD screen 12 to be operated in the opaque state so as to block light shining on the at least one location of interest within the cabin 17. Particularly, in at least one embodiment, the controller 10 is configured to select at least one pixel of the LCD screen 12 to be operated in the opaque state so as to block light shining on the face of the driver, or more particularly, on the eyes of the driver 16. In this way, the controller 10 is configured to operate the pixels of the LCD screen 12 to reduce the illumination level at the at least one location of interest within the cabin 17, such as the face and/or the eyes of the driver 16. FIG. 6B shows a shadow 412 cast on the eyes of the driver 16 by one or more pixels of the LCD screen 12 being operated in the opaque state.

In some embodiments, the controller 10 is configured to select at least one pixel to be operated in the opaque state based on a projection model that includes a mapping of the plurality of pixels to corresponding locations on the face of the driver 16. Particularly, the controller 10 is configured to store a mapping between each individual pixel of the LCD screen 12 and a corresponding location in the cabin 17, or more particularly, a corresponding location on the face of the driver 16 at which the respective pixel casts a shadow when operated in the opaque mode. It will be appreciated that the location at which a pixel casts a shadow when operated in the opaque mode is dependent on the lighting environment and, in particular, a location of any high intensity light sources, such as the sun, which shines through the windshield 19 onto the face of the driver 16. In one embodiment, the controller 10 is configured to periodically and/or continuously update the mapping between each individual pixel of the LCD screen 12 and the corresponding location on the face of the driver 16.

Figure 7A:
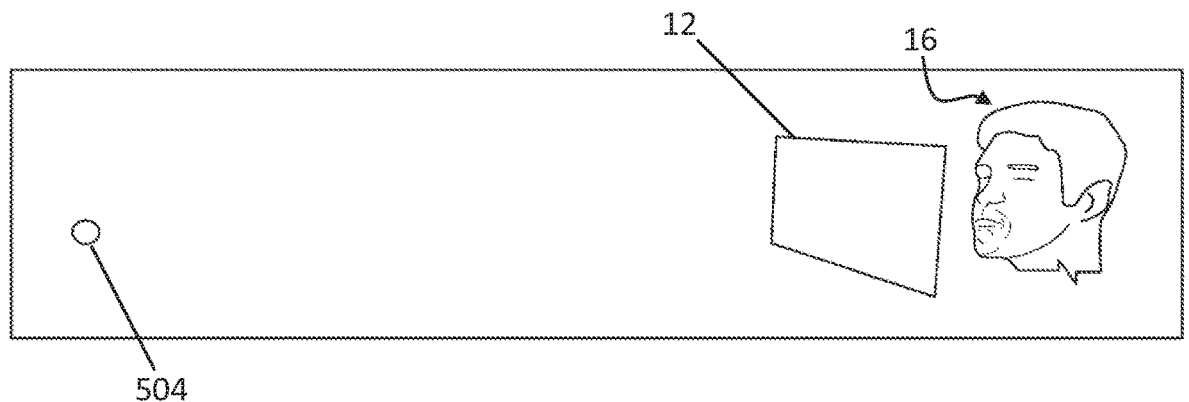
FIGS. 7A-7C illustrate the projection of illumination patterns onto the face of the driver.
Figure 7B:
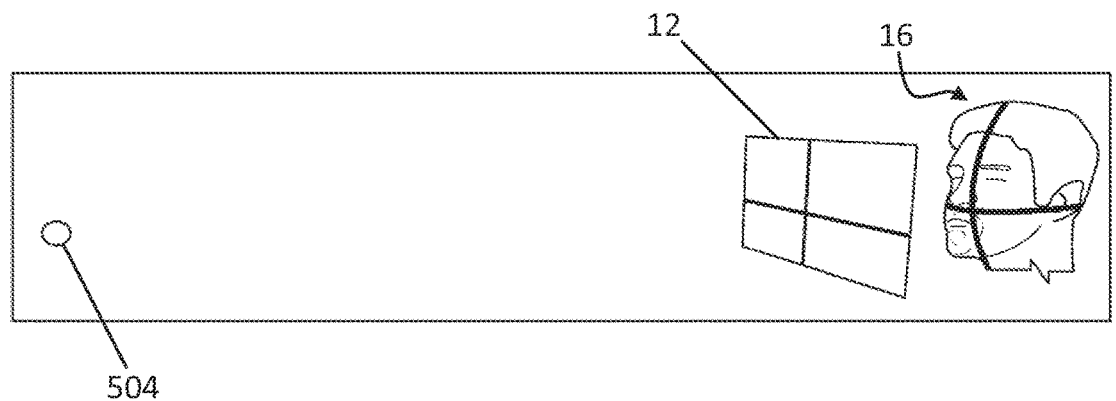
Figure 7C:
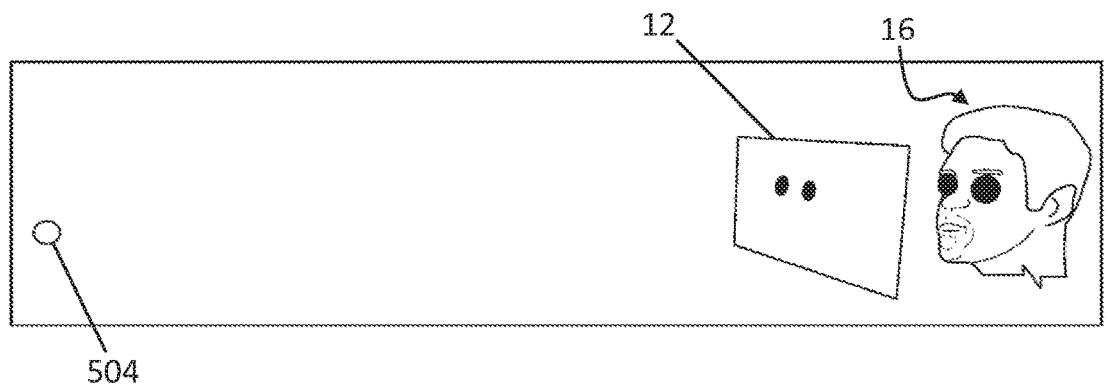

In some embodiments, the controller 10 is configured to update the mapping by operating a subset of pixels of the LCD screen 12 in the opaque state to project an illumination pattern onto the face of the driver 16. The controller 10 is configured to process image frames received from the camera 14 to detect the illumination pattern on the face of the driver 16 and determine the mapping of the pixels to corresponding locations on the face of the driver 16 based on the detected location of the illumination pattern on the face of the driver 16. FIGS. 7A-7C illustrate the projection of a predetermined illumination pattern onto the face of the driver 16. A high intensity light source 504 is shines light through the LCD screen 12 onto the face of the driver 16. In FIG. 7A, all of the pixels of the LCD screen 12 are operated in the transparent mode and, thus, the light from the high intensity light source 504 shines onto the face of the driver 16. In FIG. 7B, the controller 10 operates a predetermined subset of the pixels of the LCD screen 12 in the opaque mode to cast a shadow that forms a predetermined illumination pattern corresponding to the subset of pixels operated in the opaque mode (e.g., a cross pattern, as illustrated). Based on the location of the detected illumination pattern on the face of the driver 16, the controller 10 is configured to update and/or determine the mapping between each individual pixel of the LCD screen 12 and the corresponding location on the face of the driver 16.

It will be appreciated that the subset of pixels operated in the opaque mode can correspond to any pattern, including the pattern that is already being used to block the high intensity light source 504 from shining on the eyes of the driver 16. FIG. 7C shows the pixels of the LCD screen 12 operated to cast two circular shadows on to the eyes of the driver, thereby blocking the high intensity light source 504 from shining on the eyes of the driver 16. The controller 10 is configured update the mapping in real-time based on movements of the two circular shadows on the face of the driver 16. In this way, the projection of the shadow/illumination pattern and detection of the shadow/illumination pattern on the face of the driver via the camera form a real-time feedback loop which is used to align the shadows with the eyes of the driver 16.

In one embodiment, the controller 10 is configured to periodically or continuously update the mapping between each individual pixel of the LCD screen 12 and the corresponding location on the face of the driver 16 based on other methods. In one embodiment, the controller 10 is configured to update the mapping based on changes in the location and pose of the face of the driver 16, as detected by the controller 10 based on the image frames. In one embodiment, the controller 10 is configured to update the mapping based on changes in the direction of travel of the vehicle 18 by calculating a corresponding change in relative position of the high intensity light source 504.

In some embodiments, the controller 10 is configured to select pixels of the LCD screen 12 to be operated in the transparent or opaque state so as to achieve other purposes aside from blocking high intensity light sources from shining on the face and/or eyes of the driver 16. For example, in one embodiment, the controller 10 is configured to select at least one pixel of the LCD screen 12 to be operated in the opaque state so as to block light from shining on an electronic device, such as a smart phone or in-car navigation/infotainment system, thereby improving the readability of a screen of the electronic device. As another example, in one embodiment, the controller 10 is configured to select at least one pixel of the LCD screen 12 to be operated in the transparent or opaque state so as to illuminate a particular object in an otherwise dark setting, such as letting light shine on a book while a person is reading, while the rest of the area is shielded from the light source.

Embodiments within the scope of the disclosure may also include non-transitory computer-readable storage media or machine-readable medium for carrying or having computer-executable instructions or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A modular visor system for a vehicle, the modular visor system comprising:
    a sensor configured to detect an illumination level of at least one location within the vehicle;
    a plurality of discrete liquid crystal display (LCD) panel modules mounted within the vehicle and arranged so as to physically abut one another, each discrete LCD panel module having a plurality of LCD pixels arranged in a grid formation and a discrete set of connections configured to receive control signals that operate the respective plurality of LCD pixels, each LCD pixel configured to, (i) in an opaque state, block light from passing through a corresponding area of the respective LCD panel module and, (ii) in a transparent state, allow light to pass through the corresponding area of the respective LCD panel module; and
    a controller operably connected to the sensor and to the respective discrete set of connections of each discrete LCD panel module in the plurality of discrete LCD panel modules, the controller configured to (i) receive a sensor signal from the sensor, (ii) determine the illumination level of the at least one location based on the sensor signal, and (iii) selectively operate each pixel of the plurality of LCD pixels of each of the plurality of discrete LCD panel modules in the opaque state and the transparent state depending on the illumination level of the at least one location within the vehicle.

2. The modular visor system of claim 1 further comprising:
    a bezel configured to surround and secure the plurality of LCD pixels of at least one LCD panel module of the plurality of discrete LCD panel modules.

3. The modular visor system of claim 1, wherein the plurality of discrete LCD panel modules are arranged in a grid formation.

4. The modular visor system of claim 1, wherein a first LCD panel module of the plurality of discrete LCD panel modules is a different size than a second LCD panel module of the plurality of discrete LCD panel modules.

5. The modular visor system of claim 1, further comprising:
    a plurality of multiplexers, each multiplexer in the plurality of multiplexers operably connected to a subset of the plurality of discrete LCD panel modules, each multiplexer configured to route the control signals from the controller to the respective discrete set of connections of each of the respective subset of the plurality of discrete LCD panel modules.

6. The modular visor system of claim 1, wherein:
    the at least one location includes a face of a driver of the vehicle; and
    the controller is further configured to operate at least one LCD pixel in the plurality of LCD pixels of one of the LCD panel modules in the plurality of discrete LCD panel modules in the opaque state in response to one of (i) the illumination level on the face of the driver and (ii) a change in the illumination level on the face of the driver exceeding a predetermined threshold.

7. The modular visor system of claim 1, wherein:
the at least one location includes a face of a driver of the vehicle; and
the sensor is a camera mounted within the vehicle and pointed at the driver of the vehicle.

8. The modular visor system of claim 7, the controller further configured to:
determine the illumination level on face of the driver based on image frames received from the camera; and
operate at least one LCD pixel in the plurality of LCD pixels of one of the LCD panel modules in the plurality of discrete LCD panel modules in the opaque state in response to one of (i) the illumination level on the face of the driver and (ii) a change in the illumination level on the face of the driver exceeding a predetermined threshold.

9. The modular visor system of claim 7, the controller further configured to:
determine a baseline illumination level on the face of the driver based on previous image frames received from the camera;
determine a current illumination level on the face of the driver based on a most recent image frame received from the camera; and
compare the current illumination level with the baseline illumination level.

10. The modular visor system of claim 7, the controller further configured to:
determine locations corresponding to eyes of the driver based on image frames received from the camera; and
determine an illumination level on the eyes on the driver based on illumination at the locations in the image frames corresponding to the eyes of the driver.

11. The modular visor system of claim 7, the controller further configured to:
select the at least one LCD pixel to be operated in the opaque state to block light passing through the respective LCD panel module onto eyes of the driver, the at least one LCD pixel being selected based on a projection model that includes a mapping of the plurality of LCD pixels to corresponding locations on the face of the driver.

12. The modular visor system of claim 11, the controller further configured to:
operate a subset of the plurality of LCD pixels of one of the LCD panel modules in the plurality of discrete LCD panel modules in the opaque state to project an illumination pattern onto the face of the driver;
detect the illumination pattern on the face of the driver based on image frames received from the camera; and
determine the mapping of the plurality of LCD pixels of the one of the LCD panel modules in the plurality of discrete LCD panel modules to corresponding locations on the face of the driver based on the location at which the illumination pattern was detected on the face of the driver.

13. A modular visor system for a vehicle, the modular visor system comprising:
a camera mounted within the vehicle and pointed at a face of the a driver of the vehicle, the camera configured to capture image frames of the face of the driver;
at least one liquid crystal display (LCD) panel module mounted within the vehicle, the at least one LCD panel module having a plurality of LCD pixels arranged in a grid formation, each LCD pixel configured to, (i) in an opaque state, block light from passing through a corresponding area of the at least one LCD panel module and, (ii) in a transparent state, allow light to pass through the corresponding area of the at least one LCD panel module; and
a controller operably connected to the camera and to the at least one LCD panel module, the controller configured to:
operate a subset of the plurality of LCD pixels of the at least one LCD panel module in the opaque state to project an illumination pattern onto the face of the driver;
detect the illumination pattern on the face of the driver based on image frames received from the camera; and
determine a projection mapping of the plurality of LCD pixels of the at least one LCD panel module to corresponding locations on the face of the driver based on locations at which the illumination pattern was detected on the face of the driver; and
selectively operate at least one LCD pixel of the plurality of LCD pixels in the opaque state to block light passing through the at least one LCD panel module onto eyes of the driver, the at least one LCD pixel being selected based on the projection mapping of the plurality of LCD pixels to the corresponding locations on the face of the driver.

* * * * *